United States Patent [19]
Schlattl et al.

[11] Patent Number: 5,434,382
[45] Date of Patent: Jul. 18, 1995

[54] ELECTRODE HOLDER AND ELECTRIC SENSOR

[75] Inventors: Werner Schlattl, Ruderting; Ernst Plochinger, Salzweg, both of Germany

[73] Assignee: Bavaria-Tech, Germany

[21] Appl. No.: 139,520

[22] Filed: Oct. 18, 1993

[30] Foreign Application Priority Data

Oct. 20, 1992 [DE] Germany .......................... 42 35 308.4
Feb. 19, 1993 [DE] Germany .......................... 43 05 095.6
Feb. 23, 1993 [DE] Germany .......................... 43 05 364.5

[51] Int. Cl.6 .............................................. B23K 11/25
[52] U.S. Cl. ................................................... 219/109
[58] Field of Search ................................. 219/109, 110

[56] References Cited

U.S. PATENT DOCUMENTS

| | | | |
|---|---|---|---|
| 4,083,254 | 4/1978 | Nissl | 350/285 |
| 4,341,940 | 7/1982 | Defourny | 219/110 |
| 4,376,883 | 3/1983 | Dao et al. | 219/109 |
| 4,472,620 | 9/1984 | Nied | 219/109 |
| 4,628,175 | 12/1986 | Nissl | 219/109 |

Primary Examiner—Clifford C. Shaw
Attorney, Agent, or Firm—Rosenman & Colin

[57] ABSTRACT

An electrode holder has an optical sensor element for the detection or measurement of the electrode force.

39 Claims, 11 Drawing Sheets

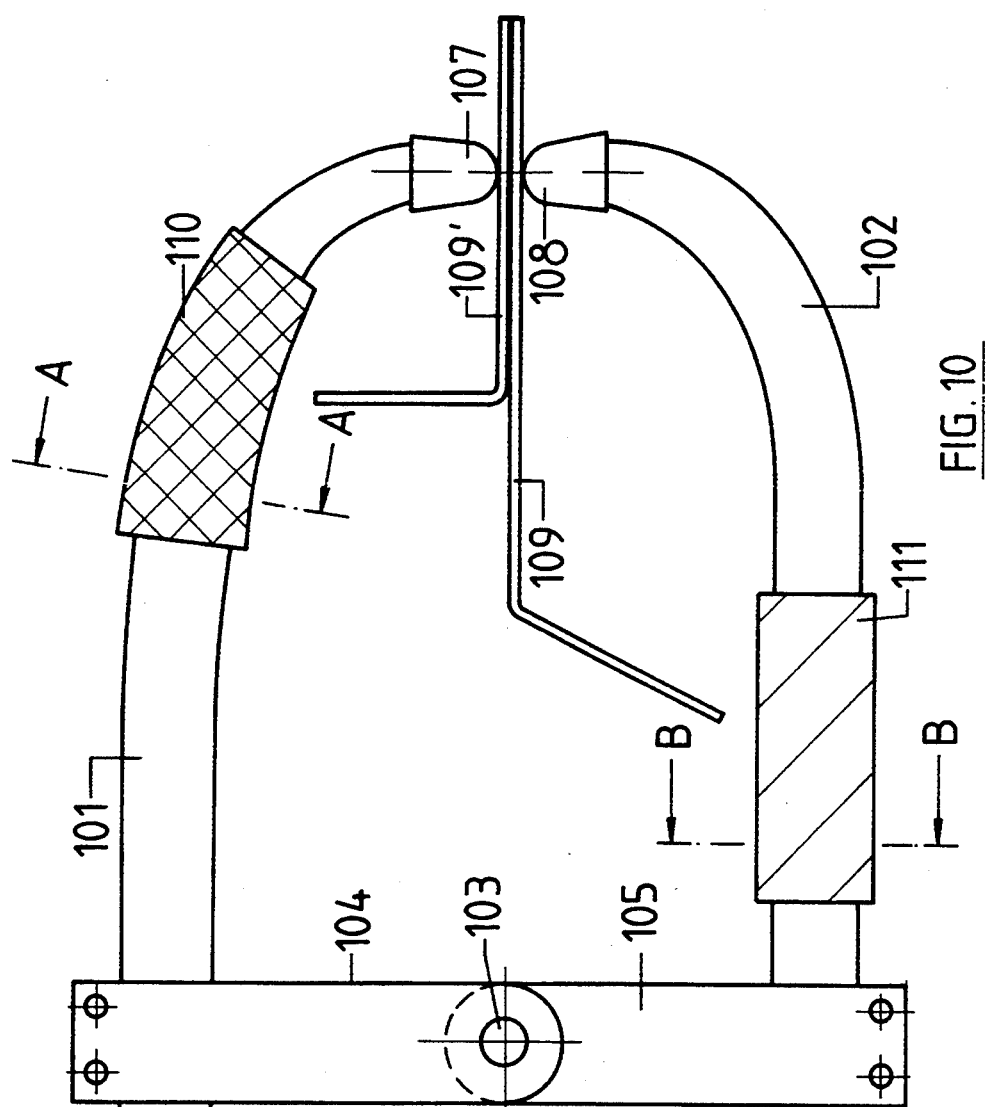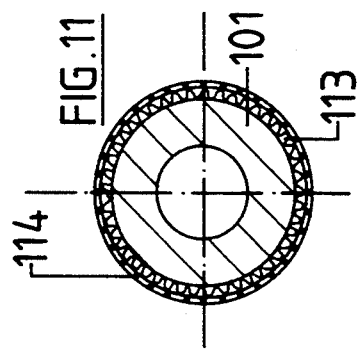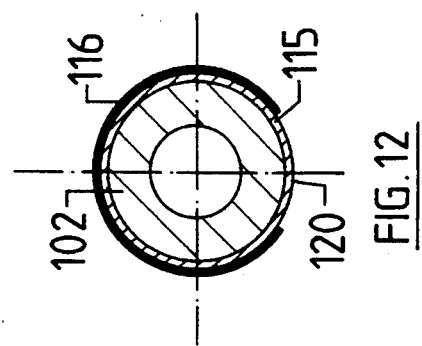

ELECTRODE HOLDER AND ELECTRIC SENSOR

The present invention relates to an electrode holder, in particular a spot-welding electrode holder.

Spot-welding electrode holders are extensively used in industry, and especially in the automobile industry, in car body manufacture or the like, in particular also as electrode holders for welding robots. By an actuating device which has, for instance a pneumatic cylinder or else a hydraulic cylinder (including water hydraulics) as actuator, the electrodes of such electrode holders can be moved towards and away from each other, namely between a starting position in which the electrodes are at a greater distance from each other and a welding position (closed electrode holder) in which the electrodes lie pressed against the material to be welded which is generally formed of metal sheets, they being applied with a force which is also referred as "electrode force". In this connection, the electrodes are arranged on electrode-holder elements, i.e. as a rule, on one end of a so-called horn, for instance with pole tips. The horns are movable or swingable relative to each other, these horns being provided, as a rule, on one end of a horn holder. The two horn holders are connected to each other by a swivel bearing.

The quality of a weld spot in spot welding is determined by three welding parameters, namely the welding current, the weld time and the electrode force. The welding current, as well, however, as also the weld time, can be controlled and/or monitored by traditional means. With the spot-welding electrode holders known up to the present time, however, it is neither possible to note the actual electrode force during the welding process, i.e., in particular during the time after the closing of the electrode holders until their reopening, nor is it possible to control the welding process as a function of the electrode force measured, particularly in view of the fact that the electrode force actually present is influenced by numerous defects in the mechanism of the electrode holder in question, for instance defective horn holders, obsolete horns, defective bearings for the horn holders and defective actuating device, etc.

If the electrode force is too great during the actual welding phase (with the welding current connected), this has the result that the material of the weld material is forced into the gap between this weld material and therefore with too small a weld spot too large a gap width also results. The strength of the weld spot in question is insufficient. The weld material is improperly deformed by the electrode and strong wear of the electrodes takes place.

If the welding force if not high enough, an internal spraying of the liquefied weld material takes place, i.e. the molten weld material which is under high pressure is sprayed into the gap between the weld material. The weld nugget itself differs from the desired round shape. The weld material and the electrodes are alloyed, the weld material is discolored and the welding current is no longer concentrated on the weld nugget in the desired manner but flows over shunts. As a whole, with too low a welding force, there also results a defective quality of the weld nugget as well as strong wear of the electrodes.

Although the above conditions have been known to those skilled in the art for decades, up to the present time there have been no electrode holders with which the electrode force and the changes therein during the welding process can be detected, for instance for quality-control of the weld nugget produced and/or for control of the welding process.

An electric electrode holder is known (Federal Republic of Germany OS 38 33 287) which has a tonglike clamping means which consists of two clamping arms which are pivotally connected to each other and can be swung relative to each other by an actuating device, and which have two electrode arms each of which bears an electrode, which are swingably connected in the manner of tongs with each other, with the same swivel axis as the two clamping arms. Between each clamping arm and an electrode arm a compression spring is provided, so that upon the welding or upon the closing of the electrode holder by actuating means, the two clamping arms first of all clamp the weld material between themselves whereupon the electrodes come against the weld material with a force which is determined by the compression springs which act in the region of the ends of the electrode arms which are remote from the electrodes and are pivotally connected to each other. What is desired is an electrode force which is as constant as possible, determined solely by the compression springs and independent of the actuating device after the closing of the electrodes and the application of the clamping arms against the weld material. At the points of attack of the compression springs, which points are located in the region of the ends of the electrode arms which are pivotally connected to each and are remote from the electrodes and thus far away from the electrodes and the welding spot in question, there is provided a piezo-electric pressure gauge by which the force developed by the springs, which force is substantially constant during the welding process is determined.

A precise determination of the electrode force, and in particular also a determination of changes with time of the electrode force during the welding process is not possible with these known electrode holders, just as little as control of the electrode force as a function of the measured values.

There is also known a welding device for electric resistance spot welding (Federal Republic of Germany Patent 32 41 897) in which an electrode holder arrangement which bears the welding electrodes consists of a lower fixed electrode holder and an upper movable electrode holder, the electrodes being connected to one end of the electrode holders. The ram of an external actuating device acts on the upper movable electrode holder via a compression spring in order to produce the electrode force. Between the spring and the ram there is a wire-strain-gauge load cell by which the force of the springs, and thus the application force exerted on the weld material, are determined.

Finally, a welding device for resistance spot welding is also known in which a lower electrode holder which is fixed in space is firmly attached to a jig frame, and an upper electrode holder is provided on a support arm which is connected to the jig frame by flexure beams.

These known welding devices have the disadvantage, first of all, that the electrode holders are fixed in position on a machine frame, only one electrode holder being movable relative to the other electrode holder in a vertical plane. These welding devices can therefore not be used as welding robots such as are required, in particular, in the automobile industry and in body building.

All known electrode holders and welding devices have the disadvantage that the piezo-electric sensors, the pressure pickups or the wire strain gauges must be arranged at a considerable distance from the place of welding and also spaced from the current path of the welding current in order to avoid the sensor in question being affected by electromagnetic fields. By the arrangement of the sensor in question at a distance from the place of welding, considerable errors result in the measurement. In particular, dynamic changes in the welding force, such as occur during the welding process, cannot be noted.

Finally, all known electrode holders and welding devices also have the disadvantage that additional elasticity in the form of compression springs or flexure beams is necessary, which elasticity, particularly also in combination with the masses present, means an impairing of the result of the measurement as well as an additional structural expense.

In the spot-welding electrode holders known at the present time, there is also the danger of electric shunting at the place of contact, since a part of the welding current flows over the shunt. In this way, the weld spots are also not properly welded and the weld spots are of reduced strength, which may lead to a risk with regard to the quality of the entire vehicle and furthermore to creaking noises in the vehicle which can no longer be eliminated subsequently.

The object of the invention is to provide electrode holders with which the actual electrode force present on the electrodes can be detected precisely and without disturbance at any time during the welding process and in particular also during the actual welding phase or weld time.

In order to achieve this object, an electrode holder is developed in accordance with the body of Claim 1.

In the electrode holder of the invention, the electrode force present can be measured precisely at any time during the welding process and the welding process can be monitored and/or controlled on the basis of the result of this measurement. Furthermore, it is also possible, based on the measured electrode force, to evaluate the weld spot in question and/or its quality and on the basis of this evaluation to decide whether possibly another adjacent weld spot is necessary and/or whether possibly one or more previous weld spots can be dispensed with, etc. This evaluation of the quality of a weld spot based on the electrode force measured and the further decisions or controls resulting from this evaluation are preferably carried out in an electronic control device in accordance with a predetermined program. Furthermore, it is also possible to record for each weld spot the course of the electrode force for subsequent evaluations, verifications, etc.

Due to the fact that in order to detect the electrode force, an optical sensor is used the operation of which is based on the fact that the amount of light transmitted over the light path in the sensor element is a function of the mechanical change in or deformation of the sensor element or of the part of said sensor element having the light path, the connection between the sensor or sensor element and the opto-electronic unit which is arranged spaced from it takes place exclusively over the at least two light guides. Despite high precision and sensitivity of the measurement, i.e., the possibility of detecting even minor mechanical changes, and despite a high cut-off frequency, the sensor element is not sensitive to external disturbing influences or, in particular, to electric voltage and magnetic fields, to electromagnetic fields or waves, to high temperatures, etc. Furthermore, the sensor element can be of robust construction so that it is not damaged even in case of severe impacts or blows.

In particular, the invention provides the possibility of precise measurement of the electrode force even when the welding current is flowing and not merely in the absence of welding current or upon the passage through zero of the periodically changing welding current. The measuring of the electrode force while the welding current is flowing is essential, since the electrode force differs between when welding current is present and not, and the electrode force when the welding current is flowing is of importance for the monitoring and/or control.

In the invention, the electrode force is detected directly on the electrode holder element due to the elastic deformation of said element during the welding process, without the necessity of providing any additional elasticity, for instance in the form of springs, flexure measurement beams, etc., for the measurement. Furthermore, the sensor element can be arranged directly at the place of welding or on the current path for the welding current, i.e. on the parts of the electrode holder which conduct the welding current. It is not necessary to take electromagnetic fields into account. Furthermore, no special construction of the horn or of the horn holder is necessary in order to measure electrode force.

Since a dynamic measurement of the electrode force is possible with the invention, i.e. a measurement of the changes with time of the electrode force, a statement as to the quality of a weld spot is also made possible for the first time on the basis of the result of the measurement.

Due to the high precision and sensitivity of the measurement, as well as due to the high cut-out frequency, which lies, for instance at 10 kHz, the variation with time of the electrode force during the jarring blow after the closing of the electrode holder can be precisely determined. In this connection, in particular, it can also be established whether this jarring blow has been completed within a predetermined period of time and the mechanism of the electrode holder in question is therefore in a proper condition. Furthermore, the variation of the electrode force during the following pre-holding time can be measured and monitored, particularly also with reference to the reaching of a given value of the electrode force at which the actual welding current is connected. Furthermore, measurement of the electrode force during the actual welding phase or weld time is possible, and due to the high sensitivity and precision of measurement in the case of the electrode holder of the invention, the thermal change in volume occurring upon the welding and the increase in the electrode force resulting therefrom can be determined during the welding phase as well as the change in volume upon the so-called "after-forging" in the after-holding time. From this, not only is an evaluation of the quality of the welding point in question possible with the invention but also an optimal control of the weld time so that an increase in the certainty of the process as well as an optimizing of the rate upon the welding can be obtained, among other things.

In one embodiment of the invention, at least one horn or one horn holder is insulated at least in a region in which contact with the weld material is possible upon the welding. The insulation consists of an insulating covering which is abrasion-proof and scrape-proof on its outer surface. This covering consists, for instance, of a special steel and it surrounds another covering of insulating material. The abrasion-resistant covering is preferably formed of a ceramic fabric or ceramic wadding. In such case, the covering can also be developed in a single layer, i.e. the ceramic material can at the same time form the electric insulation.

Due to the fact that the insulation consists of an at least single-layer, electrically insulating covering which is scrape-proof or abrasion-resistant on its outer surface and thus withstands even sharp edges of metal sheets, a long life of the insulation can be expected.

In one embodiment of the invention, the insulation is developed in at least two layers and consists of a covering of insulating material and an abrasion-protection covering arranged over it, the two coverings being permanently connected to each other. The covering of insulating material consists in this connection preferably of a glass-fiber tape impregnated with epoxy resin, for instance "Betabrace" but it may also consist of carbon fiber or the like so that dependable electric insulation is assured. The abrasion-proof coverings are developed in the form of special-steel cross-weave fabric and are pushed over the horns; upon this pushing over, they adapt themselves to curved horns so that the covering can be used for different shapes of horns. A permanent connection between the glass-fabric tape or "Betabrace" and the special-steel fabric is produced in the manner that the epoxy resin bonding agent with which the fabric tape is impregnated protrudes between the fabric and is hardened at about 150° C.

Instead of a special-steel fabric, there can be employed as anti-abrasion covering a special-steel sleeve, which with is preferably slit, or else a special-steel tape which is wound. Such special-steel sleeves or tapes are, however, limited in their use to straight or only slightly curved horns.

Comparable, high-quality anti-abrasion coverings can also be used within the present invention. For example, there is suitable for this a material by the name of "Mehanite" which is impervious to magnetic fields and with which greater efficiency can be obtained upon the welding since no energy is required for the magnetic field.

In a preferred embodiment, the insulation or covering arranged on the horn or horn holder is, at least within a partial region or in at least one layer, a ceramic fabric or a ceramic wadding. In this embodiment, the ceramic fabric or wadding preferably forms the scrape-proof and abrasion-proof outer surface of the insulation, which then consists, for instance, solely of ceramic fabric or ceramic wadding.

The insulation applied on the horn or the horn holder can be adapted in particularly simple manner to the shape of the corresponding horn or horn holder, as well as to the shape of the metal sheets to be welded together.

By the proposal of the invention, a long life can be obtained. Due to the fact that the insulation in accordance with the invention is flexible to a limited extent, a particularly good adaptability to different shapes of horns results. With such an insulation, welding defects upon spot welding can be definitely reduced so that additional safety weld spots can be eliminated and, as a whole, a reduction in the manufacturing time and accordingly a decrease in cost can be achieved. Furthermore, the safety distance between the horns and the metal sheets to be welded can be reduced so that, in this way, a reduced window surface and a lower welding current, smaller electrode holders and better handling due to less weight can be obtained.

Further developments of the invention are set forth in the dependent claims.

The invention will be explained in further detail below on the basis of one embodiment, read with reference to the drawings, in which:

FIG. 4 shows in a simplified showing the sensor element of

Figure 3:
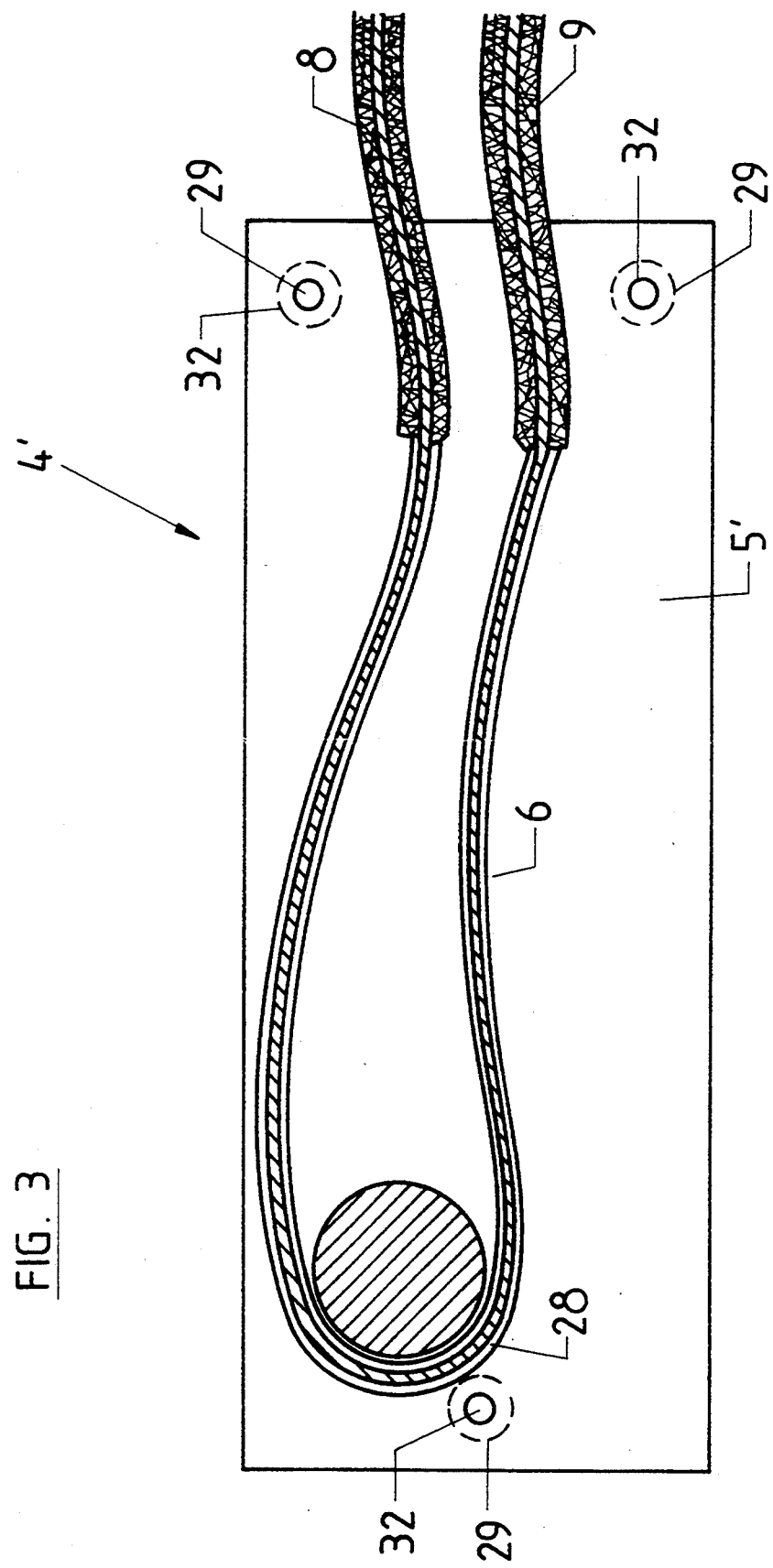
FIG. 3 shows a modified embodiment, in simplified top view.
Figure 5:
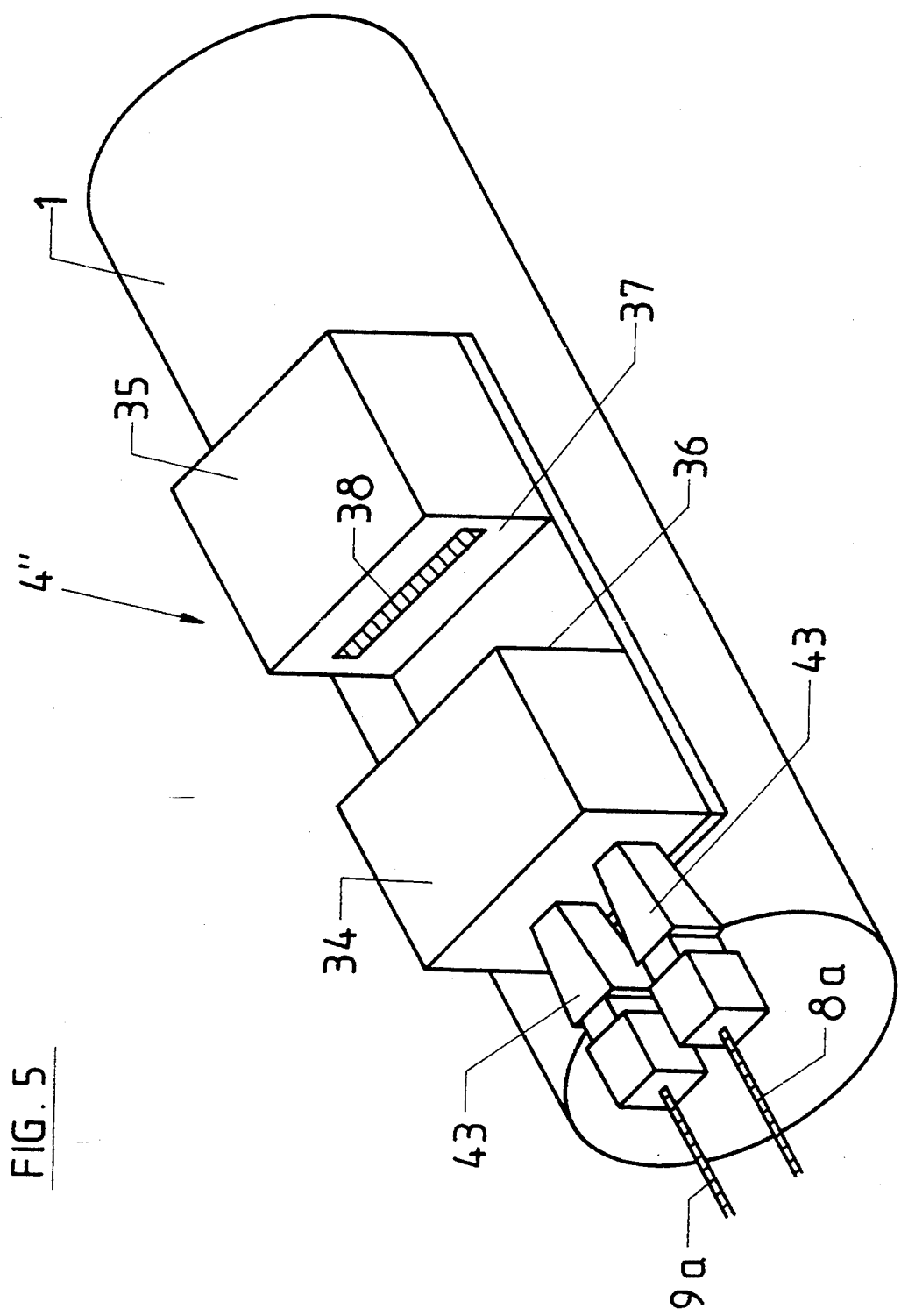
Figure 6:
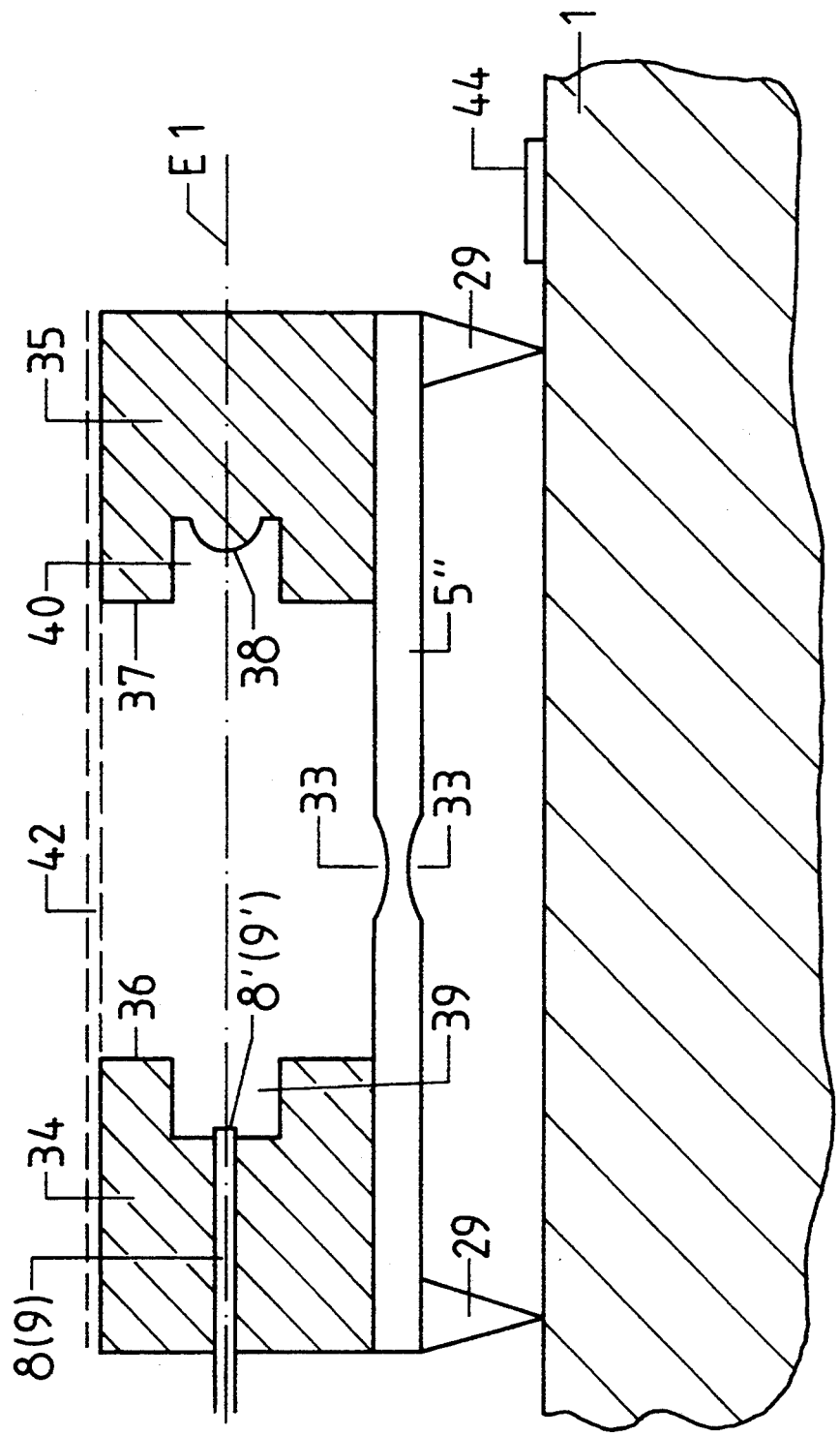
Figure 7:
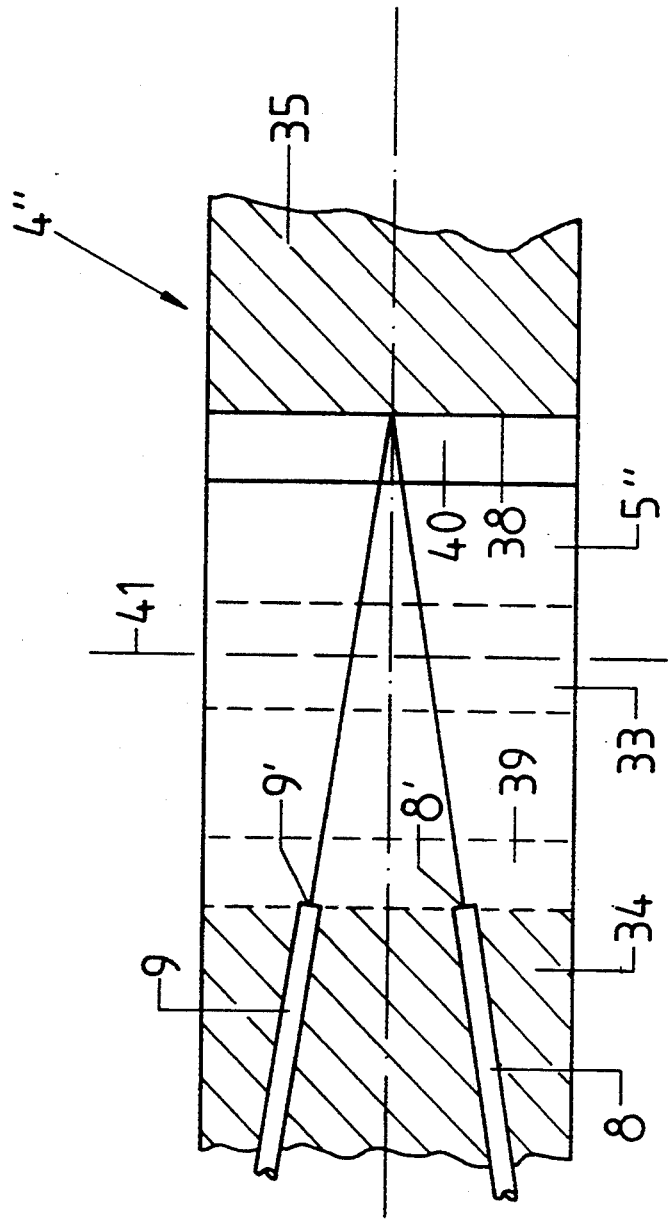
Figure 8:
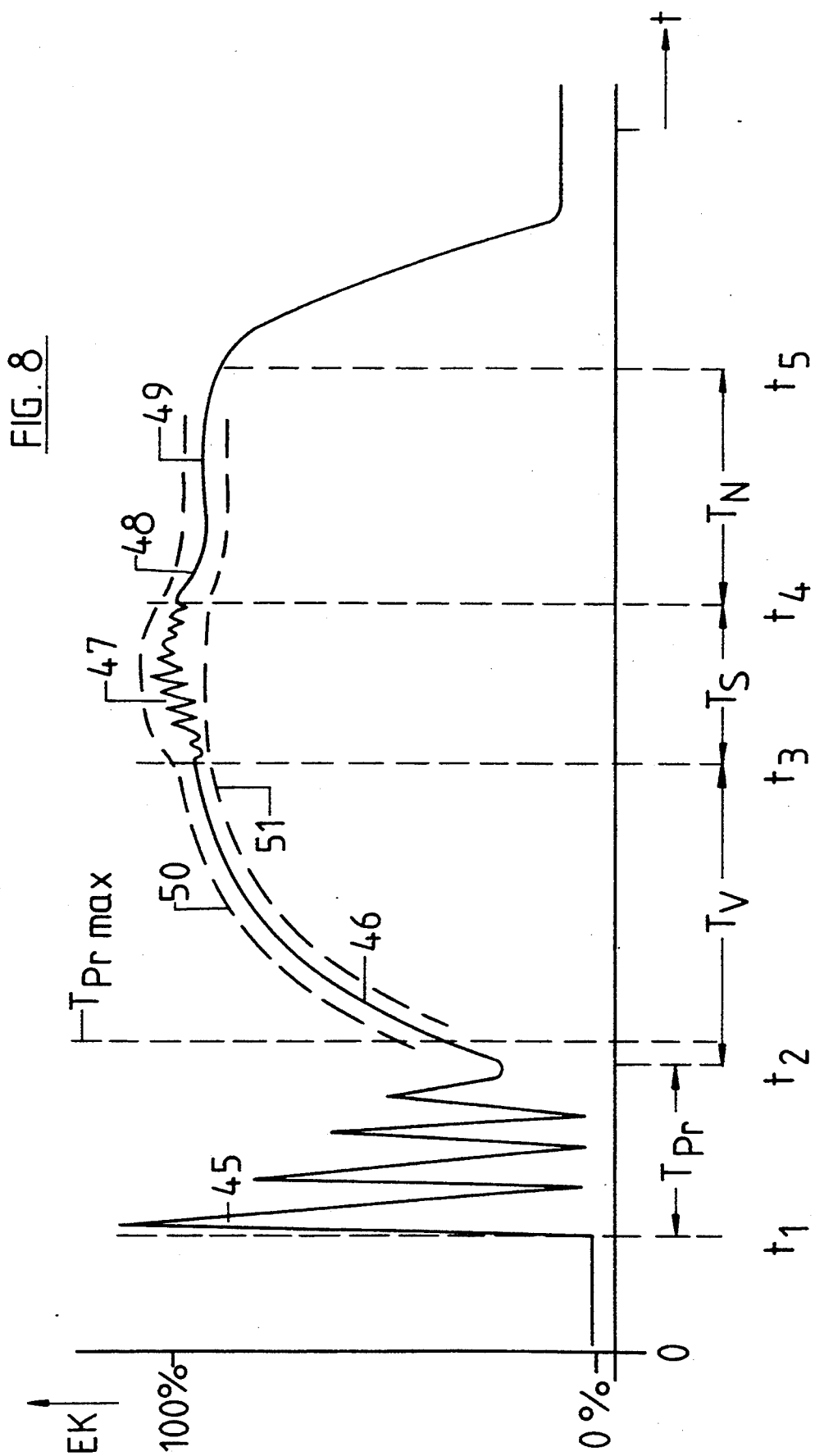
Figure 9:
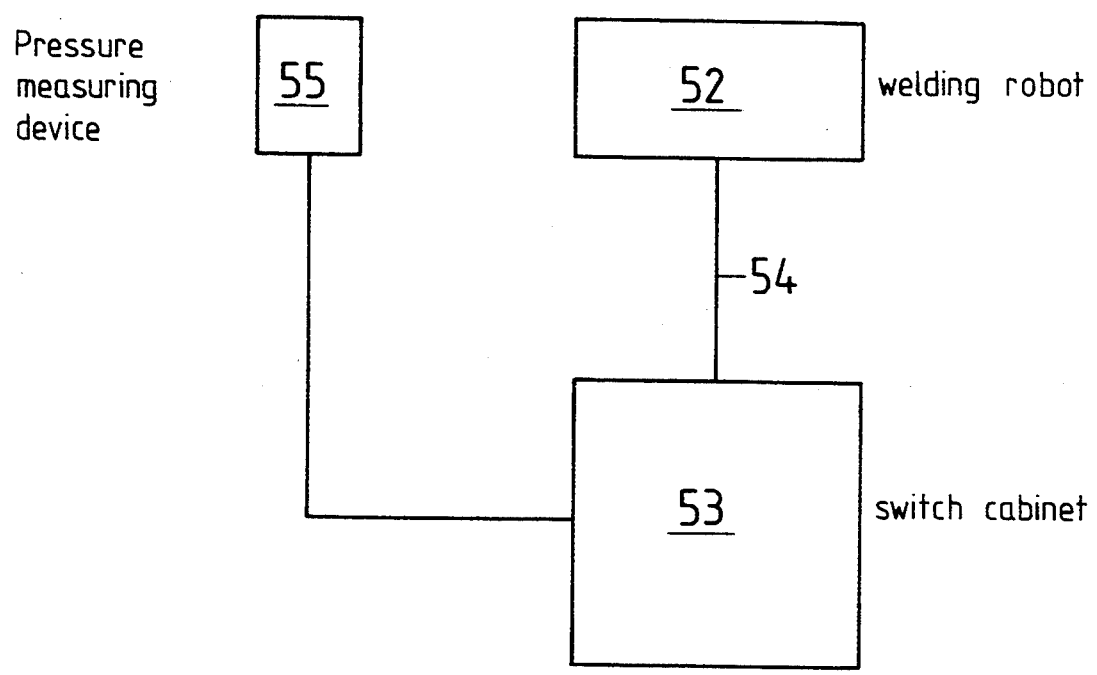

FIG. 3 in side view and in its attachment to a tubular measurement object;

FIG. 5 shows another modified embodiment of the sensor element, seen in simplified perspective view;

FIG. 6 is a longitudinal section through the sensor element of FIG. 5, in a simplified view;

FIG. 7 is a section through the sensor element of FIG. 5 along the line I—I of FIG. 6;

FIG. 8 is a graph of electric force against time of the electrode holder;

FIG. 9 is a simplified top view of a welding place;

FIG. 10 is a side view of a spot-welding electrode holder;

FIG. 11 is a section A—A through a horn according to FIG. 10; and

Figure 13:
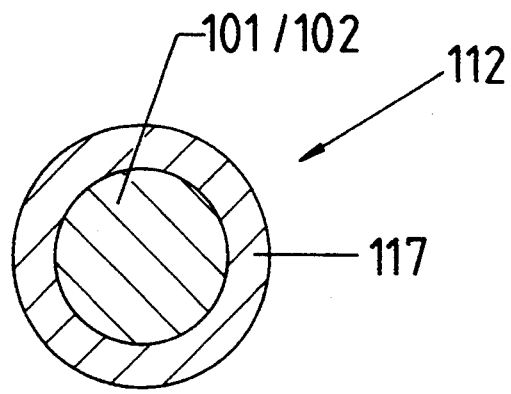

FIG. 12 is a section B—B through a horn according to FIG. 10;

FIG. 13 is a section similar to FIG. 11 or 12 in the case of another preferred embodiment of the invention.

Figure 1:
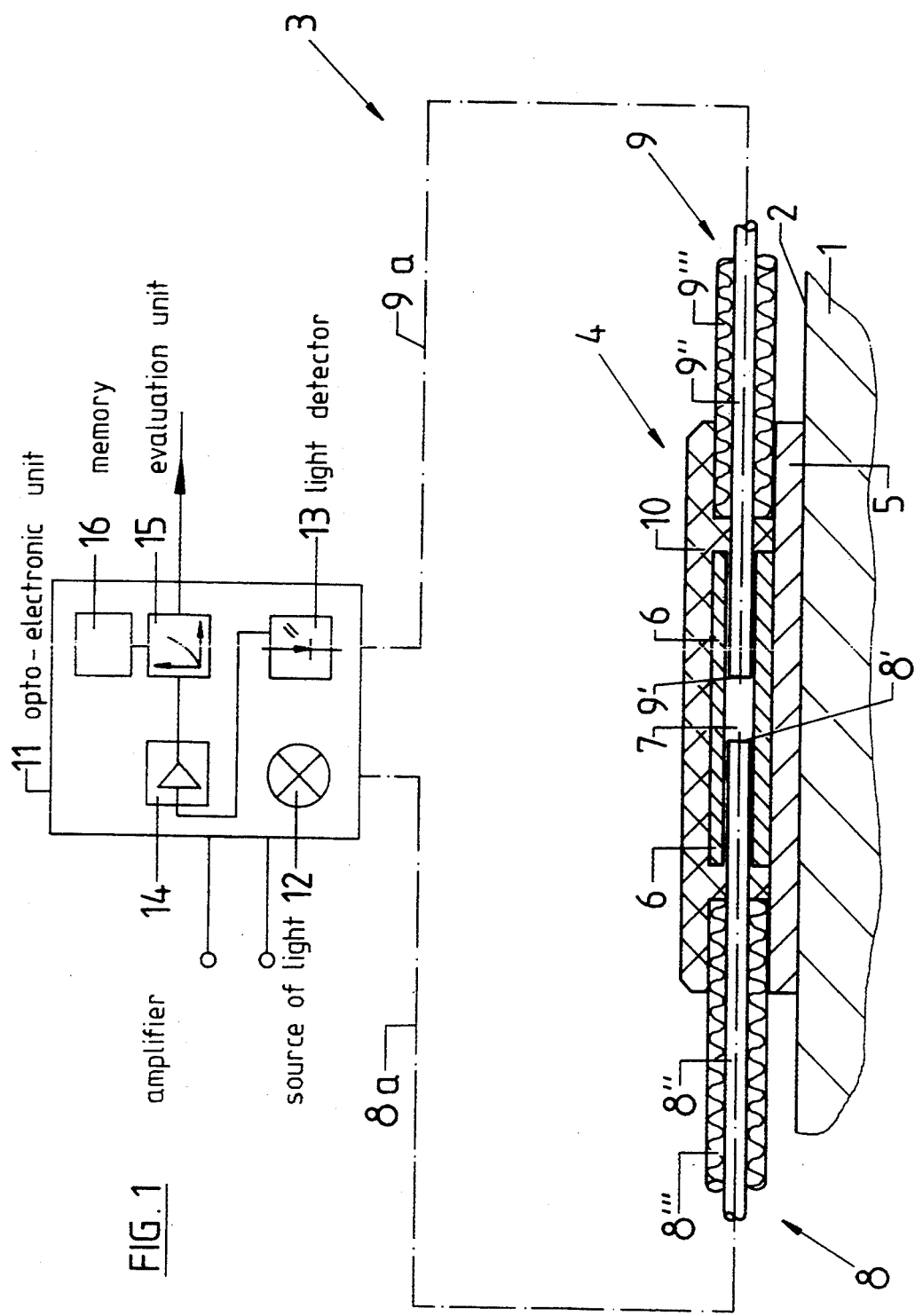
FIG. 1 shows, in a simplified showing, and in block diagram, one embodiment of the sensor of the invention, together with an opto-electronic unit.

FIG. 1 shows an electrode holder 1 for the spot-welding of two sheets 18 and 19. The electrode holder consists of two horns 20 and 21, fastened to the end of horn holders 20' and 21' respectively. These holders are pivotally connected to each other via a pivot 22 and pivot arms 23 and 24. The two pivot arms 23 and 24 are fastened between the two ends of the corresponding horn holders 20' and 21' respectively. At one end, an actuator 25, formed in the embodiment shown of a pneumatic cylinder, acts between the horn holders 20' and 21'. On their curved free ends, the horns are provided with pole tips 26 and 27 which, in the case of spot-welding, receive the two sheets 18 and 19 between themselves and are pressed against the sheets 18 and 19 with a predetermined force by the activated actuating device 25. The welding current is fed and removed via the horn holders 20' and 21', each developed as an electric conductor, as well as the horns 20 and 21 and the pole tips 26 and 27 electrically connected to the latter.

In order to reliably produce a weld spot, various parameters must be maintained, thus, for instance, also a given pressing pressure for the electrodes or pole tips 26 and 27 against the sheets 18 and 19. For the monitoring and/or control of this parameter, a sensor 3 or its sensor element 4, 4', or 4" is so arranged on the lower horn holder 21' in FIG. 1 or on the outside surface 2 there that the elastic bending of the horn holder 21' which occurs upon the pressing of the pole tips 26 and 27 against the sheets 18 and 19 and is dependent upon the pressing force can be detected by this sensor element and from it there can be determined the pressing force, which is compared for instance in a control circuit as desired value with a predetermined actual value in order in this way to control or regulate the actuator 25.

In particular, it is possible to measure the electrode force which increases upon the closing of the electrode holder and, when a predetermined value is reached, to connect the welding current, i.e. effect a connecting of the welding current which is dependent on the electrode force actually measured.

Figure 2:
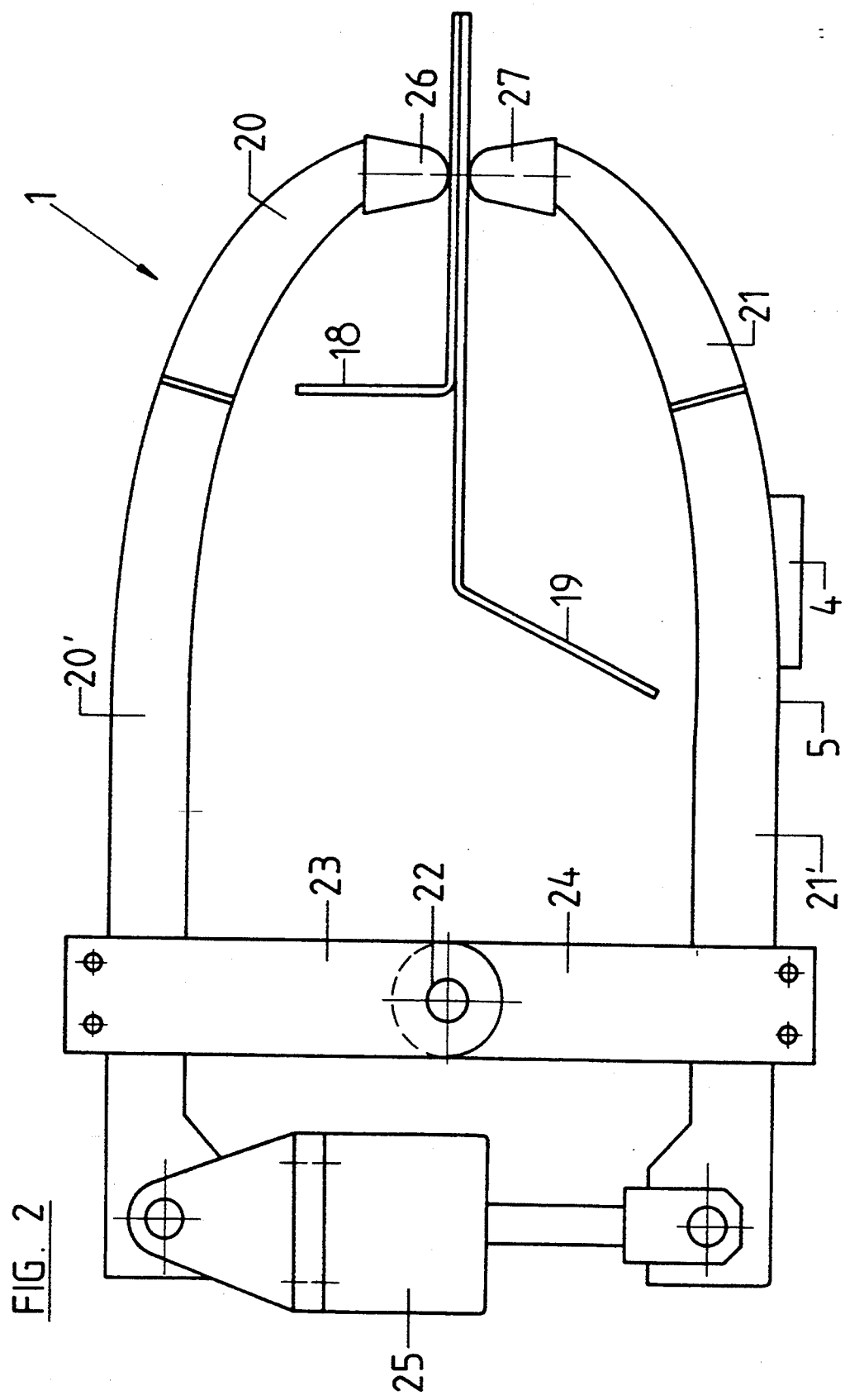
FIG. 2 shows, in a simplified view, the sensor element of the sensor of FIG. 1 on a spot-welding electrode holder.

In the embodiment shown in FIG. 2, the sensor element 4 shown there has a support plate 5 which is fastened flat on the surface 2 by soldering, bonding or in some other suitable manner, as well as a horn 6 which is held on the side of the surface facing the horn holder 21' of the support plate 5, which has for instance a rectangular contour, in such a manner that mechanical changes transmitted to the support plate 5 are also transmitted to the sleeve 6.

The sleeve 6 has a continuous bore 7 and, in the embodiment shown, is light-absorbent at least on the inner surface of this bore 7, for instance by a corresponding coloring or blackening and/or by a corresponding surface structuring.

The sensor 3 consists furthermore of two light guides 8 and 9, each of which has at least one glass fiber 8''', 9''' respectively forming the actual light-conducting element, and an outer, preferably multi-layer insulation or covering 8'''' and 9'''', respectively. One of the two light guides 8 and 9 extends with its glass fiber element 8'' and 9'' respectively into the bore 7 of the sleeve 6 from each end, in such a manner that the ends 8' and 9' of the two light guides are opposite each other approximately in the center of the sleeve 6 or its bore 7 at a predetermined distance apart in the axial direction of the sleeve 6 so that a light path between the light guides 8 and 9 is formed in an air or gas space between the ends 8' and 9'. The outside diameter which the glass-fiber elements 8'' and 9'' have at least over the part of their length which is surrounded by the sleeve 6, is slightly less in the embodiment shown than the diameter of the bore 7, so that movement of the light guides 8 and 9 and of the glass-fiber elements 8'' and 9'' respectively is possible within the bore 7. The light guides 8 and 9 are held on the support plate 5 by a blocking or covering 10 which consists, for instance, of synthetic resin (for instance epoxy resin) and also surrounds the sleeve 6 and fastens this horn to the support plate 5, or at least contributes to the fastening of the sleeve 6 to the support plate 5.

The two light guides 8 and 9 and their glass-fiber elements 8'' and 9'' respectively are held in suitable manner in the sleeve 6 and connect the sensor 3 to an opto-electronic unit 11 which forms a sensor arrangement together with the sensor 3. The opto-electronic unit has a source of light 12 to which the light guide 8 extends, as well as a light detector 13 to which the electrode force guide 9 extends, so that light from the source of light 12 is conducted via the light guide 8 to the sensor 3 and light passes as measurement signal over the light guide 9 to the light detector 13 which supplies an electric signal which is dependent on the intensity of this returned light. This signal is amplified for further use in an amplifier 14. The source of light, which is preferably a light-emitting diode, the light detector 13, which is for instance a photo-diode or a photo-transistor, as well as the amplifier 14, which is preferably an integrated circuit, are part of the opto-electronic unit 11. In the embodiment shown, this unit 11 further has an evaluation unit 15 and a memory 16. The two latter can, however, also be part of a separate unit, for instance a computer.

A well-defined luminous flux is fed to the sensor 3 over the light guide 8. This luminous flux enters at the end 8' from the light guide 8 into the bore 7 or into the light path lying between the two ends 8' and 9'. At least a part of this luminous flux enters the light guide 9 at the end 9' and is then returned via it to the light detector 13 so that there is present at the output of the light detector a signal which is dependent on the intensity of the returned luminous flux and which then leads to an output signal present at the output of the opto-electronic unit 11 or at the output of the evaluation unit 15.

Every bending, stretching, compressing or other change in the surface 2 is transmitted via the support plate 5 to the attachment of the light guides 8 and 9 to the support plate 5 and sleeve 6 respectively and leads to a change in the relative position of the ends 8' and 9' and thus also to a change in the intensity of the luminous flux fed back over the light guide 9 as well as to a change in the electric signal on the light detector 13. The luminous flux conducted back over the light guide 9 is the difference between the luminous flux fed via the light guide 8 and the losses (attenuation) which occur in the bore 7 of the sleeve 6 or in the absorption space formed there in particular by the change in the relative position of the ends 8' and 9' due for instance to the fact that as a function of the relative position of these ends a cross section of different size of the luminous flux emerging from the end 8' arrives on the end 9'.

In order to obtain a given characteristic for the sensor 4 or for the dependence between the deformation of the horn holder 21' on the surface 2 and the size of the returned luminous flux in the light guide 9, the end 8' and/or the end 9' can be shaped differently, for instance with a curvature in order to obtain a lens effect, etc.

In the opto-electronic unit, the signal of the light detector 13 amplified by the amplifier 14 is evaluated, namely by the evaluation unit 15 on basis of a calibration curve which is determined, for instance, individually after manufacture for each sensor 3 or each sensor element 4 and is stored, for instance, in the memory 16 of the evaluation unit 15, so that a particularly high precision of measurement can be obtained with the sensor 3 or with the sensor arrangement having this sensor. The evaluation unit is preferably so developed that the analog signal supplied by the amplifier 14 is converted in an analog-digital converter into a digital signal which then is further processed and/or evaluated in the evaluation unit 15, which preferably contains a microprocessor. In this case, the calibration curve is preferably stored as data record in a memory 16 of the evaluation unit 15.

The monitoring and/or control of the welding process by the sensor 3 is not impaired either by the high welding currents or by a magnetic field produced thereby, or by the temperatures which occur. The electric unit 15 can be provided on a region or which is arranged a sufficiently large distance from the welding region.

In principle, it is also possible to develop the sensor element 4 in such a manner that both light guides 8 and 9 extend away from one side of this sensor element, in which case then the luminous flux fed via the light guide 8 is deflected by means of at least one optical deflection device (mirror, prism, etc.) arranged in the sensor element 4. This deflection device is a part of the light path or is provided outside the light path.

One embodiment of a sensor element for the electrode holder 1 having a deflection device outside the light path is shown in FIG. 3. The deflection device consists in this case of a curved length 28 of one of the two light guides, namely the light guide 8.

In this embodiment, the sleeve 6 is slightly curved, i.e. the axis of the horn lies on a circle of large diameter, the axis of this circle (axis of curvature) being perpendicular to the surface sides of the support plate. This development also has the advantage that even small mechanical changes or deflections on the horn holder 21' can be noted, i.e. lead to a clear change in the intensity of the returned luminous flux or the characteristic of the sensor element 4' (dependence of the intensity of the returned luminous flux on the mechanical change) has, to a far-reaching extent, a linear course.

Figure 4:
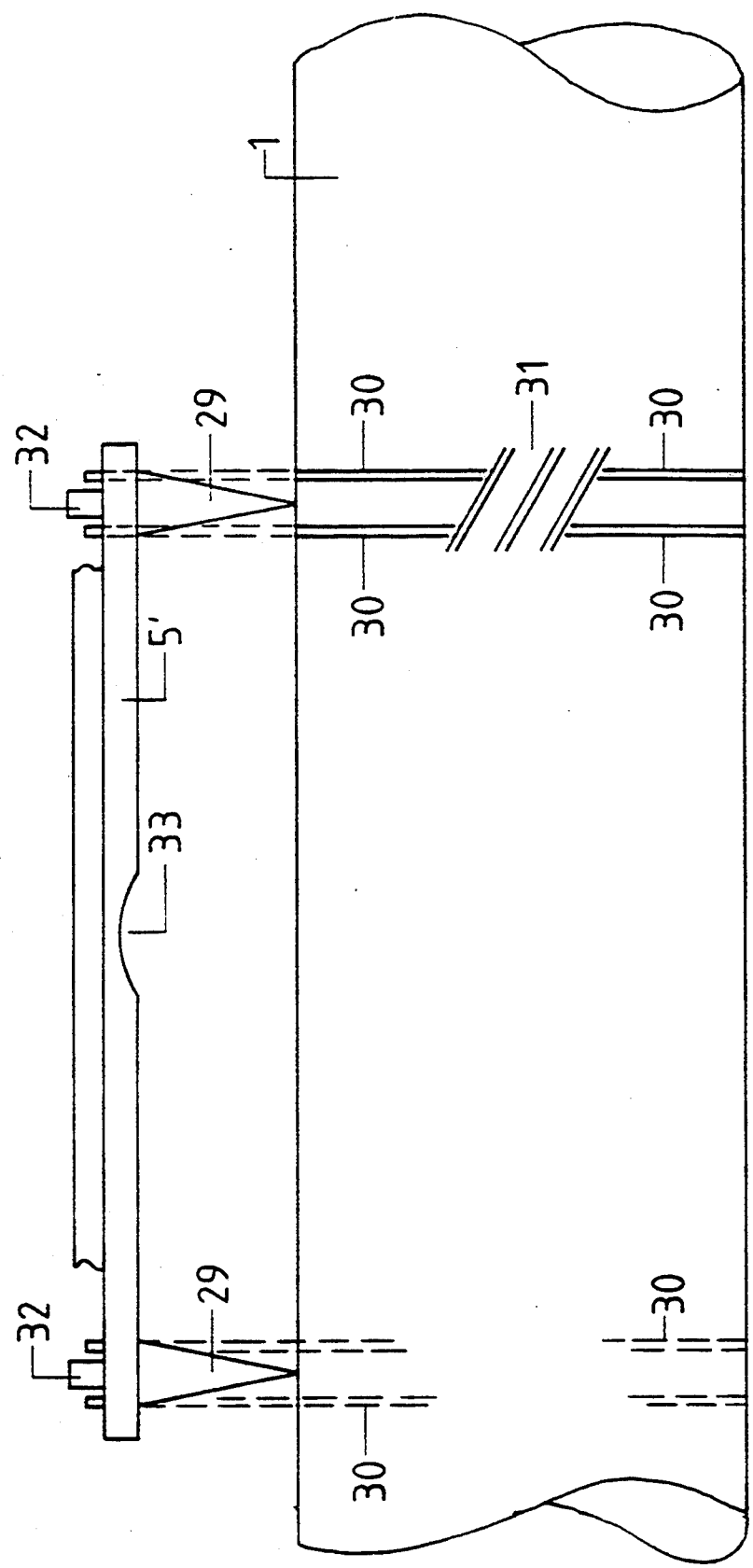

FIG. 4 shows the horn holder 21' of the electrode holder 1 and the sensor element 4' of FIG. 4 in side view. The support plate 5' is provided on its lower side facing away from the sleeve 6 with a total of three small feet 29 which are so arranged that one of these feet is in the region of the one narrow side of the rectangular support plate 5', namely in the middle of the support plate, while the two other feet are provided on the other end of the support plate at an axial distance apart perpendicular to the lengthwise direction of this support plate. By the feet 29, which taper down conically towards their free end, the support plate 5' rests on the horn holder 21' or on the cylindrical surface 2.

As indicated in FIG. 3, the two feet 29 are provided on the side on which the light guides 8 and 9 extend away from the support plate 5, and specifically on both sides of the light guides 8 and 9. In the region of the curved partial length 28, the single foot 29 is located.

The sensor element 4' or support plate 5' is held against the object being measured by two strip-shaped holding elements 30, each of which has a spring 31 and the ends of which are fastened to pins 32 which also serve for the mounting of the feet 29 and protrude above the top of the support plate 5. The holding elements 30 surround the object being measured.

As shown in FIG. 3, the support plate 5' is provided at the place where the light path between the ends 8' and 9' is formed in the sleeve 6, with a region 33 of reduced thickness which extends perpendicular to the lengthwise direction of the support plate 5'. In the embodiment shown, this region is provided only on the bottom side so that the support plate 5' forms a flat resting surface for the sleeve 6 and deformation of the support plate 5' upon a mechanical change in the object being measured is however concentrated substantially on the region of the light path.

By the feet 29 there is possible a reliable and easy arrangement of the sensor element 4' on the horn holder 21' no matter how the outside of this horn is shaped. By a suitable selection of the length of the feet 29, i.e. by suitable selection of the distance of the holding and resting regions formed by these feet from the light path or the plane thereof, the sensitivity of the sensor element 4', and thus of the sensor 3 as a whole, can be changed or set to a desired value.

FIGS. 5 and 6 show, in a simplified perspective view and in a longitudinal section respectively, as further embodiment of the invention, the horn holder 21' of the electrode holder 1, together with a sensor element 4' which is characterized by a particularly simple and strong construction, by high sensitivity and, in particular, also high dynamics. The sensor element consists of a support plate 5'' which corresponds approximately to the support plate 5' and is made, for instance, of titanium or a fiber-reinforced plastic. The production of the support plate 5'' from titanium or preferably from the fiber-reinforced plastic, has the advantage of a high lack of sensitivity of this plate to disturbing influences, particularly also to heating, as a result also of the magnetic field which builds up during the welding around the horn 21 or the horn holder 21'. The support plate 5'' against rests by three conical pins or feet 29, which are made of hard metal and dig into the horn holder 21', on the latter. The attachment is effected again by means of the holders or fastening elements 30 shown in FIG. 4.

On the top side of the support plate 5'' of rectangular contour which is opposite the feet 29, two blocks or blocklike elements 34, 35 are provided, namely in each case one element 34 or 35 on each end or each narrow side respectively of the support plate 5''. In the embodiment shown, the elements 34 and 35 are of block shape and are so fastened to the top of the support plate 5'' that those end sides 36 and 37 of the two elements 34 and 35 which face each other and are substantially perpendicular to the top of the support plate 5'' as well as to its lengthwise direction, are spaced from each other.

7 and 8 are again the two light guides, which are held or fastened in the region of their ends 8' and 9' in the element 34 in such a manner that these light guides lie, within the region of these ends, with their axes in a plane which is parallel to the top of the support plate 5'' and spaced from it, and furthermore the axes form with each other an acute angle, the vertex of which lies in the region of a mirror 38 formed on the end side 37 of the element 35 at least when the horn holder 21' or the sensor element 4'' is relieved from stress, i.e. when no bending moment is exerted on the support plate 5''. The mirror 38 is developed or arranged set back in a groove 39 with respect to the end side 37, the groove being arranged in the end side 37 and its lengthwise direction extending parallel to the top of the support plate 5''. The mirror 38 furthermore is concavely curved or arched on its mirror surface facing the end side 36 around an axis which lies in the plane E1 of the light path or parallel to said plane. In this way, the result is obtained that even a small deflection of the mirror 38 results in a large change in the amount of light transmitted to the light guide 8. The sensitivity or measurement range of the sensor can be adjusted by the radius of the curvature. The end side 36 of the element 34 is provided with a groove 40 which corresponds to the groove 39 and which lies in the lengthwise direction of the support plate 5'' and parallel to the plane E1 of the groove 39. On the bottom of the groove 40, the two ends 8' and 9' for the emergence and re-entrance of light respectively are provided.

Between the two elements 34 and 35 the support plate 5'' is provided both on its top side and on its bottom side with the region 33 which reduces the thickness of the support plate. These regions 33, which lie one above the other, thus define an axis 41 which is parallel to the plane E1 and perpendicular to the lengthwise direction of the support plate 5' and within the region of which the support plate 5'' is preferably bent if, upon loading of the horn holder 21', the latter is subjected to a bending stress.

The grooves 39 and 40 as well as the space formed between the elements 34 and 35 are closed off from the outside in at least a dust-proof and light-proof manner by a housing or covering 42.

Due to the fact that both the ends 8' and 9' as well as the mirror 38 are arranged in the bottom of a groove 40 or 39 respectively, set back with respect to the end sides 36 and 37 respectively, the influence of stray light is very decisively reduced.

When the horn holder is free of stress, the luminous flux emerging at the end 8' is so reflected by the mirror 38 that this luminous flux enters completely or almost completely at the end 9' into the light guide 9. If, upon the closing of the electrode holder, the horn holder 21' is deformed due to the electrode force EK with which the pole tips 26 and 27 rest against the sheets 18 and 19, then bending of the support plate 4" takes place in the region of the axis 41, with the result that, as a function of this deformation and thus as a function of the pressing force or electrode force of the electrode holder 1, only a part of the amount of light emerging at the end 8' is still reflected by the mirror 38 at the end 9' for entrance into the light guide 9. This loss of light and this " attenuation" are a function of the bending of the horn holder 21' and thus of the electrode force acting on the pole tips.

As furthermore shown in FIG. 5, the two light guides 8 and 9 are so developed that a separation of the light guides is possible at the sensor element 4" or at the side of the element 34 facing away from the element 35. For this purpose, plugs 43 are provided there, such as used for light guides or light guide cables.

By means of the plugs 43, it is possible to remove the corresponding sensor element 4" frequently and conveniently from the corresponding electrode holder 1 and horn 21.

As will be explained in further detail below, the light guides 8 and 9 lead from the corresponding electrode holder 1 Up to the opto-electronic unit 11 which is separated in space from the electrode holder 1 or from a robot having this electrode holder. In order to be able to remove also the electrode holder as a whole from the robot and/or to remove or separate the robot from a control unit which also includes the opto-electronic unit, at least two further plug connections are preferably provided in each light guide 8 and 9.

The sensor element 4" has a high sensitivity of measurement, i.e. deflections as slight as 1/10,000 mm can be recognized with it. Furthermore, the sensor element 4" has a high dynamic sensitivity, i.e. a cut-out frequency which lies on the order of magnitude of 10 kHz. This is particularly important in order to be able to detect the jarring occurring at the start of a welding process upon the closing of the electrode holder and also to be able to effect measurements or determinations when the jarring or the corresponding jarring blow has terminated. The production of the light signal which is dependent on the stresses on the horn 21 and the transmission of this signal to the opto-electronic unit 11 takes place with the speed of light.

44 is a temperature detector which is provided on the horn holder 21' and measures the temperature of this horn holder. The temperature detector 44 supplies an electric signal which is dependent on the temperature of the horn holder 21' to, for instance, the evaluation unit 15. With this signal, a calibration or readjustment can be effected in the manner that temperature-conditioned deformations of the support plate 5" and of the horn holder 21', as well as changes in the amount of light transmitted which may result herefrom, do not affect the result of the measurement supplied by the opto-electronic unit 11. The sensor element 4" is of course again arranged on the inner concave or outer convex side of the horn holder so that the elastic deflection of the horn holder 21' which is dependent on the pressing or welding force leads to the bending of the support plate 5" in the region of the axis 41.

Spot welding is determined essentially by three parameters, one of which, in addition to the welding current and the weld time, is the electrode force EK, i.e. that force by which the electrodes or pole tips 26 and 27 are pressed against the sheets 18 and 19 which are to be welded together. The welding current can be measured with traditional means. The weld time is entered via a control. The electrode force can be measured with the sensor element 4" and corresponding opto-electrical unit 11 so that a continuous, very precise measurement or verification of this force during a welding process is possible.

The electrode force is of decisive importance for the quality of a weld spot, as will be explained below.

FIG. 8 shows, in the form of a graph, the electrode force EK as a function of the time. It is assumed in this connection that at time t1, the electrode holder is closed, i.e. the electrodes or pole tips 26 and 27 are placed on the sheets 18 and 19. Initially, there is an increasing electrode force and then a change with time of this electrode force, which is due to jarring processes or to a so-called jarring blow which is due, on the one hand, to the inherent elasticity of the sheets 18 and 19 but, on the other hand, among other things, in particular also to the elasticity of the electrode holder 1 itself and in this connection, in particular, to the elasticity of the horn holders 20' and 21', the horns 20 and 21, etc. themselves, these periodic changes in the force also being dependent on the condition or aging of the horns 20 and 21 and of the pivot point 22. With intact electrode holder 1, this jarring blow is at an end at the time t2. A given average value can be determined empirically for the duration $T_{Pr}$ of this bounce blow.

In FIG. 8, it has been assumed that the time t2 at which the jarring blow has actually terminated, is reached still before the expiration of the time or time window $T_{prmax}$.

As from the time t2 there then, first of all, takes place a continuous increase of the electrode force corresponding to the course 46, until reaching a maximum electrode force. If a value is reached which corresponds approximately to about 90% of the maximum electrode force, namely at the time t3, the welding current is turned on. During the welding process the electrode force is held substantially constant, certain variations, however, due to the welding process being present as indicated by the course 47 in FIG. 8. The time between t2 and t3 is known as the pre-holding time $T_v$. During this time, a certain electrode current can already flow for the preparation for the welding process. At the time t4, the weld time $T_S$ is at an end, namely when—caused in particular also by changes in the material structure of the sheets 18 and 19 to be welded together—there is a decrease in the electrode force, as indicated by the course 48 in FIG. 8. The electrode force is then held at a constant value for an after-holding time $T_N$, namely until the time t5. The electrode holder 1 then opens.

By the sensor element 4", the course of the electrode force EK during the jarring blow after the closing of the electrode holder 1 is detected and it is established at what time this jarring blow is at an end. If this is not possible within the predetermined time window $T_{Prmax}$, then by this the control device recognizes that mechanical defects are present, for instance defective or outmoded electrodes, defective actuator 25, defective mounting, etc. No weld spot is produced.

With the sensor element 4", the electrode force is then monitored further, also during the pre-holding time $T_V$, during the weld time $T_S$, and during the after-holding time $T_N$, namely as to whether the face lies within a predetermined tolerance range the upper and lower limits of which are determined, for instance, by respective envelope curves 50 and 51.

It is thus recognized, in particular, with the sensor element 4" whether the electrode force is possibly too high, i.e. exceeds the envelope curve 51.

The monitoring and control can be so effected, for instance, in detail that after the end of a predetermined period of time or of a predetermined time window for the pre-holding time $T_V$, it is checked by means of the sensor element 4" whether the maximum electrode force or at least a corresponding value lying within the predetermined tolerance range (envelope curves 50 and 51) has been reached. If so, then the welding current is turned on. If the required value for the electrode force is not reached, the welding current is not turned on. Rather, an error signal is produced which causes, for instance, the weld robot bearing the electrode holder 1 to attempt again another weld spot at a somewhat shifted place and/or indicates to the operating or maintenance personnel that the electrode holder 1 requires maintenance or repair.

Furthermore, by means of the sensor element 4", a control during the pre-holding time $T_V$ is also possible as to whether, if the measured electrode force corresponds to 90% of the maximum electrode force or a corresponding, still permissible value which lies within the tolerance range, the welding current is turned on so that if the electrode holder 1 is operating properly, the pre-holding time $T_v$ actually continues only until this value of the electrode force has been reached and the pre-holding time therefore need not include any additional safety time periods, as a result of which the length of the corresponding welding process can be considerably reduced, so that a substantial increase in the output of the weld robot (number of weld spots produced per unit of time) is possible.

Also in the case of this control, the welding current is not connected if the 90% electrode force is not reached within the predetermined time window, an error signal being rather given off which, in its turn, causes the robot having the electrode holder 1 to attempt another weld spot at another place and/or indicates to the operating or maintenance personnel the necessity of the maintenance of repair of the electrode holder or of the welding robot.

During the weld time $T_S$, it is in turn monitored, in the simplest case, whether the electrode force lies within the predetermined tolerances (envelope curves 50 and 51). If so, the weld spot in question is indicated as properly produced. If not, then the weld robot is so controlled, for instance, via a corresponding error signal that another additional weld spot is produced at a different place and/or the necessity of maintenance or repair of the electrode holder 1 or of the corresponding welding robot is indicated to the operating or maintenance personnel. The noting of the electrode force in the weld time Ts, however, also means that the changes in volume caused by the transition from the alpha lattice to the gamma lattice are detected, as well as the changes in volume upon the so-called " after-forging" in the after-holding time $T_N$. Thus, the weld spot in question can be judged and a clear statement is possible as to whether a suitable weld spot has been produced.

Furthermore, it is also possible to detect the descending course 48 of the electrode force during the weld time $T_S$ and derive from this a criterion for the disconnecting of the welding current and the commencement of the after-holding time $T_N$. This then means that the weld time $T_S$ is actually only as long as is necessary for the production of the corresponding weld spot, and the weld time therefore need not contain any additional safety time periods. This also leads to an optimizing and reducing of the total welding time.

FIG. 9 shows diagrammatically a welding robot 52 having the electrode holder 1 as well as the corresponding control which is arranged in a switch cabinet 53. 54 is a flexible line between the robot 52 and the switch cabinet 53. This connection also contains the light guides 8 and 9, i.e. the opto-electric unit 11 is arranged within the switch cabinet at a sufficient distance from the welding robot 52 and thus, in particular, protected also from external disturbing influences and especially from magnetic fields, etc. Within this switch cabinet 53 there are also contained the other control elements for the welding robot 52 and for the electrode holder 1, including the electronic means for detecting and evaluating the signals supplied by the sensor or sensor element 4".

The sensor elements 4, 4', 4" described have, among other things, also the advantage that the changes in the amount of light transmitted which are due to the corresponding mechanical change of the horn holder 21' are much greater than those changes in the amount of light which are due solely to the bending of the light guides 8 and 9. A bending of these light guides and of the connection 54, such as occurs upon the movement of the welding robot 52 and/or of the electrode holder 1, thus does not lead to any impairment or falsification of the measurement result of the corresponding sensor element.

In addition to the advantages mentioned above, the sensor element 4" as a result of its special construction, has, among other things, also the advantage that the elements 34 and 35 which furthermore can also be produced in one piece with the support plate 5", as well as the grooves 39 and 40 provided on these elements and the channels provided on the element 34 to receive the light guides 8 and 9 in the region of their ends 8' and 9' can be made with such a high degree of precision that the sensor element 4" can be produced at low cost.

In FIG. 9, 55 is a pressure or force measuring device which is arranged separately from the welding robot 52, within the movement space of the electrode holder 1, in such a manner that, during a calibrating mode, this pressure measuring device 55 can be grasped by the electrode holder 1 and arranged between the pole tips 26 and 27. By means of the actuator 25, they are then pressed against the pressure measuring device 55, of course without the welding current turned on. The signal supplied by the pressure measuring device 55 is compared in a control device, for instance in the opto-electronic unit 11 arranged in the switch cabinet 53, with the signal derived from the sensor element 44 during this calibration mode. If necessary, a calibration device provided in the opto-electric unit can be so readjusted that the measurement signal derived from the sensor element 4" corresponds to the measured value measured by the pressure measuring device 55. In the simplest case, the calibrating device is an amplifier of variable degree of amplification.

Also in this calibration mode, which is periodically repeated after a predetermined number of welding processes or weld spots, a signal which indicates necessary maintenance or repair can be produced, when the difference between the measured value derived from the sensor element 4″ and the measured value derived from the pressure measuring device 55 is outside of a predetermined tolerance range.

The invention has been described above on the basis of embodiments. It is obvious that changes and modifications are possible without thereby going beyond the inventive concept. Thus, it is possible, for instance, to provide the sensor element 4, 4′ or 4″ also on the horn 21 or on another element of the electrode holder which deforms elastically as a function of the electrode force.

In the embodiments described, it has been assumed that the source of light 12 supplies substantially constant light of a predetermined intensity. In principle, however, it is also possible to use a source of light 12 which gives off light which varies in intensity in accordance with a predetermined pattern, for instance a pulsating light or a light which changes in pulse-like manner in intensity so that in this way there is a possibility, upon the evaluation of the measurement signal, of eliminating any external disturbing influences in the evaluation unit 15 by means of special filters and/or programs.

In one possible embodiment, at least two measurement or light paths in separate sleeves 6 or in a common sleeve are formed between ends 8′ and 9′ of light guides on the sensor element 4 or 4′ or on the support plate 5 or 5′ there. These light paths are then provided in different axial directions, preferably in axial directions which are perpendicular to each other. In this way, it is possible to detect mechanical changes in the measurement object 1 along different axes.

It is preferable to provide the light guides 9 and 9a as well as the light detector 13 in duplicate so that two signals dependent on the electrode force are present within the unit 11 and in which way, by suitable processing or evaluation of these signals, disturbing influences, for instance variations in brightness of the source of light 12, influences on the light guides, etc. which affect the light transmission factor can be automatically compensated for. The light guides 8 and 9 or 8a and 9a used are in this case preferably combined to form a light-guide cable so that external influences, for instance a bending, act in the same direction on all light guides.

In a preferred embodiment, after a new installation of an electrode holder, i.e., for instance, upon the placing in operation of a new electrode holder or of a repaired or newly equipped electrode holder, several test weldings (weld spots) are first of all produced with it. The variation of the welding force is in each case measured and stored upon these test weldings. If the last test welding, for instance, has led to a weld spot of the required quality, then the variation of the electrode force stored upon this welding process is established as desired reference curve for which then the two envelope curves 50 and 51 are determined and established.

Upon the following weldings (weld spots), the reference curve and envelope curves determined in this manner are used to control and/or evaluate the welding process. With the electrode holder open, the zero point of the measurement signal supplied is automatically corrected or set.

In FIG. 10, the two horns of the spot-welding electrode holder are designated 101 and 102. These horns are connected together pivotally by a pivot point 103 and pivot arms 104, 105, which may also be horn holders, and by an actuator 106, for instance a pneumatic cylinder, connected to the ends of the electrodes 101 and 102. The horns 101 and 102 are developed curved in the embodiment of FIG. 10 (upper and lower horns are shown with different curvature), without the invention being limited to this. On the facing ends of the horns 101 and 102 there are arranged pole tips 107, 108 which form the weld electrodes and between which the two sheets 109, 109′ which are to be connected to each other by spot welding are received and are in contact with them. On the electrode 101 there is an insulation 110 (section A—A) and on the electrode 102 an insulation 111 (section B—B).

The construction of the insulation 10, shown in cross section in FIG. 11, shows the electrode 101, the glass fabric tape 113 which directly surrounds the horn, and the special-steel cross-weave fabric 114 which is attached permanently, for instance via an epoxy resin bonder, to the glass fiber tape 113.

In the sectional showing of FIG. 12, the horn 102 is surrounded by a glass fabric tape 115 which is impregnated with epoxy resin and receives on its outside the split special-steel horn 116.

FIG. 13, in a view similar to FIGS. 11 and 12, shows, as further embodiment, an insulation 112 which is preferably used instead of the insulations 110 and 111.

The insulation 112 consists of a sheathing 117 which surrounds the horn 101 or 102 and is formed of one or more layers of the ceramic fabric or of a ceramic wadding. The insulation 112 has the advantage that the ceramic material forms a particular scrape-proof and abrasion-proof outer surface for the insulation 112, the outer surface also having a high resistance to sharp-edged sheets 109 and 109′.

The insulation 112 can be produced in particularly simple manner. Furthermore, with the insulation 112 one avoids the formation on its outer surface, even upon lengthy use, of regions which, for instance upon replacement of the insulation 112, result in the danger of injuries by sharp or needle-like elements which protrude from the insulation.

| LIST OF REFERENCE NUMERALS USED | |
|---|---|
| 1 | Electrode holder |
| 2 | Surface |
| 3 | Sensor |
| 4, 4′, 4″ | Sensor element |
| 5, 5′, 5″ | Support plate |
| 6 | Horn |
| 7 | Bore |
| 8, 9 | Light guide |
| 8′, 9′ | End |
| 8″, 9″ | Glass fiber element |
| 8‴, 9‴ | Sheathing |
| 10 | Covering |
| 11 | Opto-electronic unit |
| 12 | Source of light |
| 13 | Light detector |
| 14 | Amplifier |
| 15 | Evaluation unit |
| 16 | Memory |
| 18, 19 | Sheet |
| 20, 21 | Horn |
| 22 | Pivot place |
| 23, 24 | Pivot arm |
| 25 | Fastening device |
| 26, 27 | Pole tip |

-continued

LIST OF REFERENCE NUMERALS USED

| 28 | Partial length |
| --- | --- |
| 29 | Feet |
| 30 | Attachment element |
| 31 | Spring |
| 32 | Pin |
| 33 | Region |
| 34, 35 | Element |
| 36, 37 | End side |
| 38 | Mirror |
| 39, 40 | Groove |
| 41 | Axis |
| 42 | Covering |
| 43 | Plug |
| 44 | Temperature detector |
| 45–49 | Course |
| 50, 51 | Envelope curve |
| 52 | Welding robot |
| 53 | Switch cabinet |
| 54 | Connection |
| 55 | Pressure measuring device |

We claim:

1. An electric electrode holder comprising:
at least one electrode holder element which has a welding electrode and can be pressed by an actuating device (25) with the electrode (26) against a material being welded (18, 19) with an electrode force,
at least one opto-electric sensor (3) having a sensor element (4, 4', 4") which is mounted on the electrode holder element with at least one part (5, 5', 5", 6) of the sensor element (4, 4', 4") for the detection or measurement of the electrode force such that the part (5, 5', 5", 6) of the sensor element follows an elastic bending of the electrode holder element (21') corresponding to the electrode force,
a light path provided on said part (5, 5', 5", 6) which is connected via a light-guide arrangement (8, 9) to a opto-electric unit (11) of the sensor so that light from at least one light source of the opto-electric unit (11) is fed to the light path via the light guide arrangement (8, 9) and the amount of light sent back via the light guide arrangement to the opto-electric unit (11) or the amount of light absorbed in the light path is a function of the bending of said part (5, 5', 5", 6) of the sensor element (4, 4', 4").

2. An electrode holder according to claim 1, characterized by the fact that the light path (8', 9') is provided between at least two light guides (8, 9) which form the light guide arrangement.

3. An electrode holder according to claim 2, characterized by the fact that the light path is formed between a first end (8') forming a light exit of a first light guide (8) and an end (9') of a second light guide forming a light inlet.

4. A spot-welding electrode holder according to claim 1, characterized by means for connecting and disconnecting the weld current as a function of a measurement signal determined by the electronic switching arrangement (11).

5. An electrode holder according to claim 1, characterized by means for the monitoring, indicating or comparison of the electrode force determined by the sensor element (4, 4', 4") with predetermined values.

6. An electrode holder according to claim 5, characterized by the fact that said predetermined values are a desired or reference curve or upper and lower tolerance limits.

7. An electric electrode according to claim 6, characterized by the fact that said predetermined values are a desired or reference curve or upper and lower tolerance limits, in the form of envelope curves (50, 52).

8. An electrode holder according to claim 1, characterized by at least one temperature detector (44) on the electrode holder elements (21) and/or on the sensor element (4, 4', 4") which, as a function of the temperature, supplies an electric signal for the compensating of temperature effects to the electronic switching arrangement (11).

9. An electrode holder according to claim 1, characterized by means for calibrating the measurement signal supplied by the switching arrangement (11).

10. An electrode holder according to claim 1, characterized by an external pressure or force measuring device (55) comprised of the electrode holder (1) or its electrodes and which, in a calibration mode of the electrode holder, is acted on with a force by the electrodes of said electrode holder and the measurement signal of which is compared with the measurement signal derived from the sensor element (4, 4', 4") for the calibrating of the switching arrangement.

11. An electrode holder according to claim 1, characterized by the fact that said part (5, 5, 5", 6) of the sensor element (4, 4', 4") in which part the light path is formed is connected to the electrode holder element via at least two holding or resting regions which are separated in space from each other.

12. An electrode holder according to claim 10, characterized by the fact that the holding and resting regions are formed in each case by a small foot which preferably tapers down conically towards its free end and that these feet are provided on a housing or support which forms or receives said part (5, 5, 5", 6) of the sensor element.

13. An electrode holder according to claim 10, characterized by the fact that the holding or resting regions are spaced from the plane of the light path (8', 9').

14. An electrode holder according to claim 1, characterized by the fact that the light path is formed in a space (7) of the part (5, 5, 5"6) of the sensor element (4, 4', 4") which space is closed off in light-proof manner from the outside at least for the spectrum of the light fed via the first light guide (8).

15. An electrode holder according to claim 1, characterized by the fact that the two ends (8', 9') of the light guides (8, 9) are arranged axially opposite each other.

16. An electrode holder according to claim 1, characterized by the fact that the light path contains in the path between the light guides (8, 9) or its ends (8', 9'), at least one light-reflecting element, a mirror (38) which is concavely curved around a mirror axis on its mirror surface, the mirror axis lying in the plane of the light path or parallel to said plane.

17. An electrode holder according to claim 1, characterized by the fact that the ends (8', 9') of the light guides (8, 9) and/or the light reflecting element (38) are arranged on projections or elements (34, 35) facing each other on the part of the sensor element (4"), and on one side of the support plate (5").

18. An electrode holder according to claim 1, characterized by the fact that the ends (8', 9') of the light guides (8, 9) and/or the light reflecting element (38) are arranged in depressions (39, 40) on surfaces (36, 37) facing each other.

19. An electrode holder according to claim 1, characterized by the fact that said part (5, 5, 5", 6) of the sensor element (4, 4', 4") is arranged on or in a housing (6, 10).

20. An electrode holder according to claim 1, characterized by the fact that said part of the sensor element (4, 4', 4") is part of a housing (5, 5, 5", 6, 10) in which the light path is formed.

21. An electrode holder according to claim 1, characterized by the fact that in said part (5, 5, 5", 6) of the sensor element (4, 4', 4") or in its housing (5, 5, 5", 6, 10) there is an inner space, an inner space formed by a bore (7), into which the ends (8', 9') of the light guides (8, 9) fastened to the housing extend.

22. An electrode holder according to claim 1 characterized by the fact that said part of the sensor element (4, 4', 4") is formed by a horn (6) having a continuous bore (7) into which the ends (8', 9') of the light guides (8 9) extend in such a manner that said ends (8', 9') are spaced from each other in the bore (8).

23. An electrode holder according to claim 22, characterized by the fact that the horn (7) is fastened on a support plate (5, 5, 5") of the sensor element (4, 4', 4") which forms the surface of the sensor element (4, 4', 4") fastened to the electrode holder element (21).

24. An electrode holder according to claim 22, characterized by the fact that the light guides (8, 9) are fastened in the horn (5, 5, 5", 6)

25. An electrode holder according to claim 22, characterized by the fact that the light guides (8, 9) are fastened on the support plate (5, 5, 5") and/or on a covering (10) provided on it.

26. An electrode holder according to claim 1, characterized by the fact that at least one light guide (8, 9) is curved at its end (8', 9'), lenticularly curved.

27. An electrode holder according to claim 1, characterized by the fact that the axis of the horn (5, 5, 5", 6) is slightly curved, around an axis which extends perpendicular to a surface for the attachment of the sensor element (4, 4', 4") to the electrode holder element (21).

28. An electrode holder according to claim 1, characterized by the fact that the sensor element (4, 4', 4") has at least two light paths (8', 9') arranged in different axial directions.

29. An electrode holder according to claim 1, characterized by the fact that the light fed over the first light guide (8) is a constant luminous flux or a luminous flux which varies in a predetermined pattern.

30. An electrode holder according to claim 1, characterized by an opto-electronic unit (11) which has a source of light (12) cooperating with the first light guide (8) and a light detector (13) cooperating with the second light guide (9).

31. An electrode holder according to claim 1, characterized by an evaluation electronic system or unit (15) for formation of the measurement signal on the basis of a predetermined calibration curve.

32. An electrode holder according to claim 30, characterized by the fact that the calibration curve is stored in a memory, in a memory (16) of the evaluation unit (15) or of the opto-electronic unit (11).

33. An electrode holder according to claim 1, characterized by the fact that the sensor element (4, 4', 4") is removably fastened to the electrode holder (1) or the electrode holder element (21).

34. An electrode holder according to claim 1, characterized by the fact that the electrode holder element (21) has a curved course and that the sensor element (4, 4', 4") is provided on a convex or concave side of the sensor element (4, 4', 4")

35. An electrode holder according to claim 1, characterized by the fact that the at least one electrode holder element is formed of a horn holder (21') and of a horn (21) fastened to one end of this horn holder, and that said at least one sensor element (4, 4', 4") is provided on the horn holder.

36. An electrode holder according to claim 1, characterized by the fact that on at least one horn or horn holder (104, 105) within a region which can come into contact with the material being welded upon the welding, there is provided an insulation (110, 111, 112) which has a scrape-resistant or abrasion-resistant outer surface, this outer surface being formed by a covering (114, 116) of special-steel, and by the outer surface of a covering (117) consisting of a ceramic fabric and/or ceramic wadding.

37. An electric electrode holder comprising:
at least one electrode holder element which has a welding electrode and can be pressed by an actuating device (25) with the electrode (26) against a material being welded (18, 19) with an electrode force,
at least one opto-electric sensor (3) having a sensor element (4, 4', 4") which is mounted on the electrode holder element with at least one part (5, 5', 5", 6) of the sensor element (4, 4', 4") for the detection or measurement of the electrode force such that the part (5, 5', 5", 6) of the sensor element follows an elastic bending of the electrode holder element (21') corresponding to the electrode force,
a light path provided on said part (5, 5', 5", 6) which is connected via a light-guide arrangement (8, 9) to a opto-electric unit (11) of the sensor so that light from at least one light source of the opto-electric unit (11) is fed to the light path via the light guide arrangement (8, 9) and the amount of light sent back via the light guide arrangement to the opto-electric unit (11) or the amount of light absorbed in the light path is a function of the bending of said part (5, 5', 5", 6) of the sensor element (4, 4', 4") said part (5, 5', 5", 6) of the sensor element (4, 4', 4") being connected to the electrode holder element via at least two holding or resting regions which are separated in space from another.

38. An electric electrode according to claim 37, characterized by the fact that the holding or resting regions are spaced from the plane of the light path (8', 9').

39. An opto-electric Sensor (3) for the use on an electric electrode holder having at least one electrode holder element which has a welding electrode and can be pressed by an actuating device (25) with the electrode (26) against a material being welded (18, 19) with an electrode force, said opto-electric sensor (3) comprising:
a sensor element (4, 4', 4") which can be mounted on the electrode holder element with at least one part (5, 5', 5", 6) of the sensor element (4, 4', 4") for the detection or measurement of the electrode force such that the part (5, 5', 5", 6) of the sensor element follows an elastic bending of the electrode holder element (21') corresponding to the electrode force,
a light path provided on said part (5, 5', 5", 6) which is connected via a light-guide arrangement (8, 9) to a opto-electric unit (11) of the sensor so that light from at least one light source of the opto-electric unit (11) is fed to the light path via the light guide arrangement (8, 9) and the amount of light sent back via the light guide arrangement to the optoelectric unit (11) or the amount of light absorbed in the light path is a function of the bending of said part (5, 5', 5'', 6) of the sensor element (4, 4', 4'') said part (5, 5', 5'', 6) of the sensor element (4, 4', 4'') being connected to the electrode holder element via at least two holding or resting regions which are separated in space from another.

* * * * *